June 26, 1945.  R. G. LE TOURNEAU  2,379,091

CHUCK

Filed May 17, 1944  2 Sheets-Sheet 1

Inventor
R. G. LeTourneau

By *Webster & Webster*
Attorneys

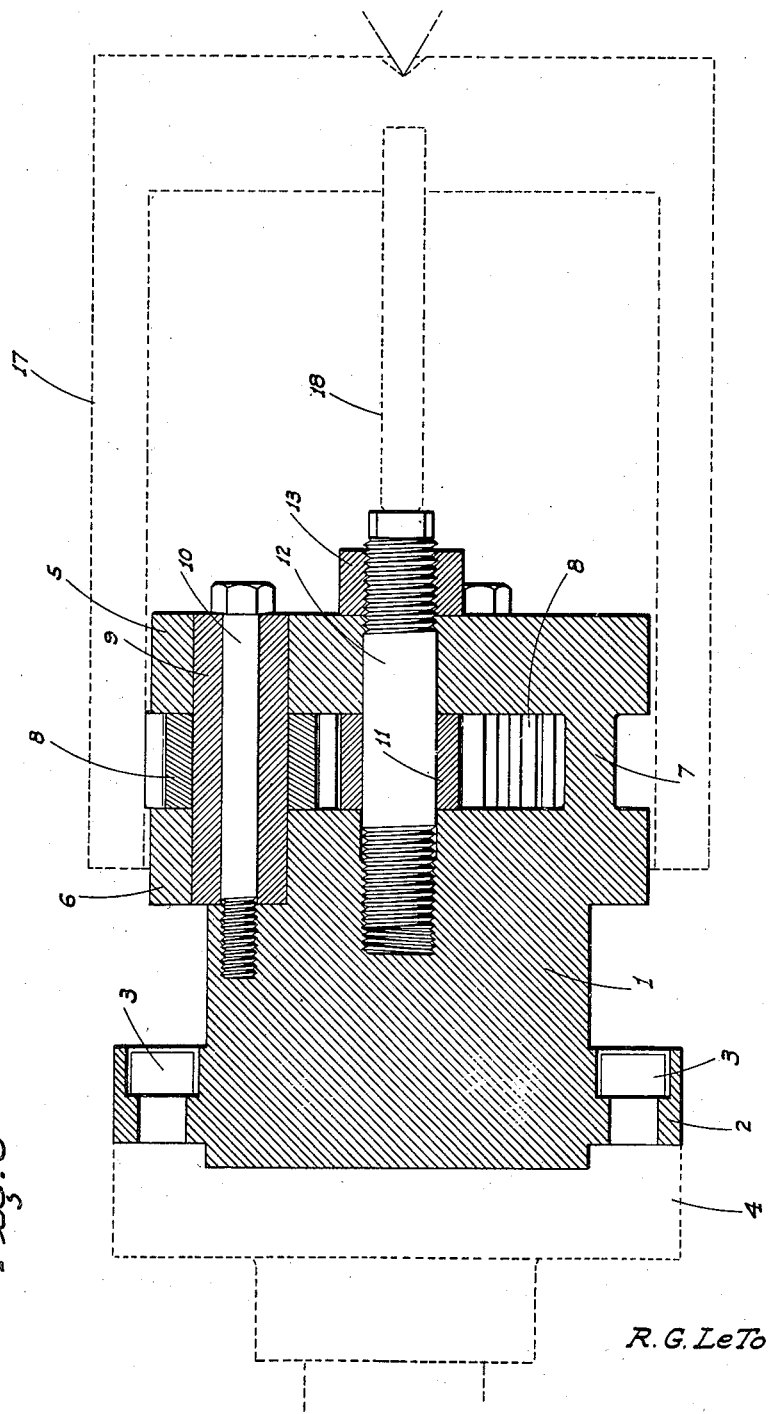

Patented June 26, 1945

2,379,091

UNITED STATES PATENT OFFICE 2,379,091

CHUCK

Robert G. Le Tourneau, Peoria, Ill., assignor to R. G. Le Tourneau Inc., Stockton, Calif., a corporation of California Application May 17, 1944, Serial No. 535,952

1 Claim. (Cl. 279—2)

This invention relates in general to an improved chuck for lathes, and in particular the invention is directed to, and it is an object to provide, a novel expanding chuck for use with hollow open-ended work; the chuck engaging in the work in holding and driving relation.

An additional object of the invention is to provide an expanding chuck in which the work engaging members comprise the teeth of a plurality of rotatably mounted gears; said gears being arranged so that the teeth thereof act as work engaging and driving dogs.

A further object of this invention is to provide a chuck, of the type described, which comprises a plurality of like, work engaging gears rotatably mounted on a driven supporting body in circumferentially spaced relation and for rotation about axes parallel to the chuck axis, and a central gear with which the work engaging gears mesh in common whereby to maintain all of the latter in the same relative rotative positions at all times; the periphery of the work engaging gears being eccentric to the axes thereof, while said gears are otherwise concentric and mesh conventionally with the central gear, the eccentricity being equal at corresponding peripheral points whereby upon rotation of said gears in one direction or the other the chuck is expanded or contracted.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Figure 3 is an enlarged longitudinal sectional elevation illustrating the chuck as engaged with the work.

Figure 1:
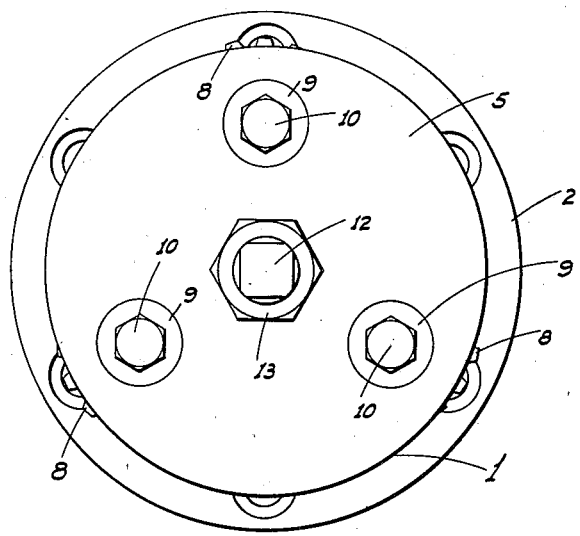
Figure 1 is a front end view of the chuck.
Figure 2:
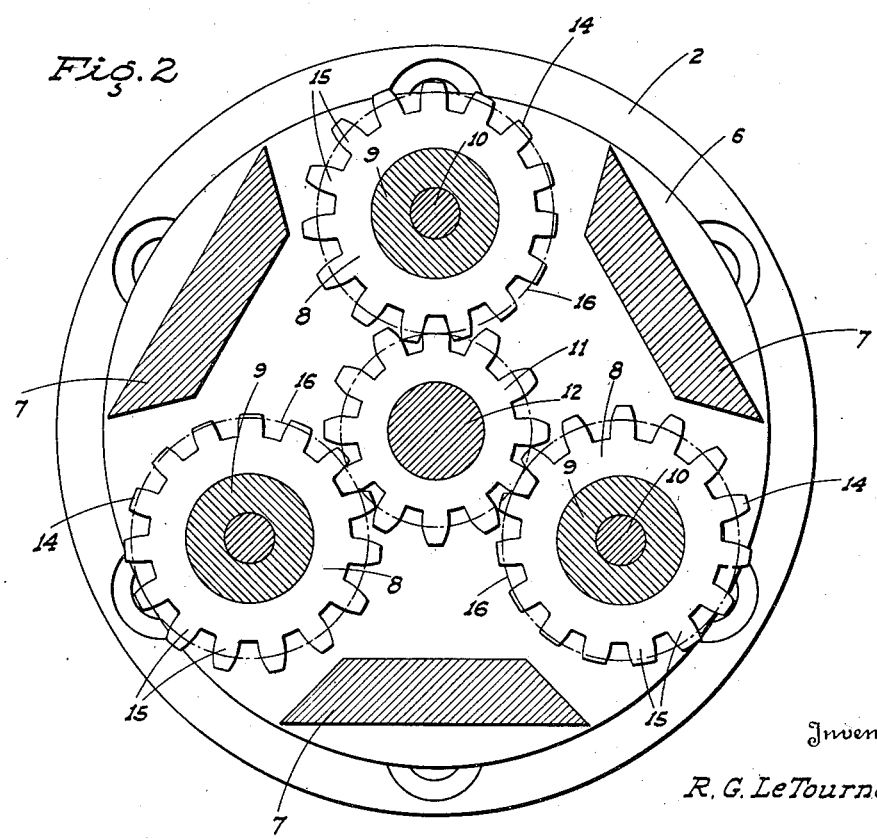
Figure 2 is an enlarged cross section of the chuck.

Referring now more particularly to the characters of reference on the drawings, the chuck comprises a cylindrical body 1 formed adjacent its rear end with an enlarged radial flange 2 which is adapted for rigid connection by means of bolts 3 to the face plate 4 of a lathe.

The body 1 is cylindrical and adjacent its forward end it includes a front circular wall 5 and a back circular wall 6 maintained in spaced, parallel relation by a plurality of circumferentially spaced webs 7 disposed adjacent but short of the periphery of said walls.

A plurality of relatively wide faced gears 8 are rotatably mounted between walls 5 and 6 on tubular spindles 9 retained in place by bolts 10 extending therethrough; said gears being symmetrically disposed and projecting between the webs 7. These gears, which are of identical construction, mesh in common with a central gear 11 carried on a central spindle 12 which extends between walls 5 and 6; such central spindle being threaded into the body at its inner end and having a lock nut 13 threaded on its outer end in abutment with wall 5.

The gear 11 has a number of teeth which is an even multiple of the number of gears 8 and, as is obvious, the gears 8, upon rotation of one thereof, all similarly rotate to the same extent and in the same direction.

The gears 8 are eccentric at the periphery and this is accomplished by varying the length of the addendum 14 of the teeth 15 beyond the pitch line 16; said gears being otherwise concentric and meshing with the central gear 11 in on-center relationship. The gears 8 are of such outside diameter that they project radially outward beyond the periphery of walls 5 and 6, as clearly shown in Fig. 1; the extent of projection depending on the rotative position of said peripherally eccentric gears.

In use of the above chuck, the same projects into the open end of tubular work 17 in initially easy fitting relation; the teeth 15 of one or more gears 8 first engaging and supporting said work. The gears 8 at the outset are in a position of minimum projection.

However, upon rotation of the chuck, the gears 8 are all simultaneously rotated—by one or more being in engagement with the work—in a direction to increase the projection of the eccentric periphery of said gears beyond the periphery of walls 5 and 6 and into positive frictional and driving engagement with said work; the teeth 15 then serving as driving dogs.

As the gears are symmetrically spaced about the axis of the chuck, they also function to automatically center the work as they come into play, causing expansion of the chuck.

Longitudinal positioning of the work is accomplished by means of a stop-pin 18 engaged between the outer end of central spindle 12 and the opposite and closed end of said work; adjustment of said central spindle axially causing corresponding adjustment of the work. The stop-pin 18 can be removably mounted in the work, or formed as an extension of said spindle.

From the foregoing description it will be readily seen that I have produced such a device as substantialy fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

An expanding chuck comprising a driven rotary body, a plurality of gears mounted on the body in circumferentially spaced relation about the chuck axis and for rotation about axes parallel to the latter, said gears being alike and eccentric at the periphery thereof, such eccentricity existing only radially out from the pitch line of said gears and said pitch line being concentric, and a central gear with which all of the work engaging gears mesh; said work engaging gears being disposed in such relative rotative positions that the radial projection of said gears toward the work is equal at all times.

ROBERT G. LE TOURNEAU.